United States Patent
Hartmann et al.

(10) Patent No.: US 7,054,710 B2
(45) Date of Patent: May 30, 2006

(54) ELECTRONIC CONTROL FOR GLASS MOULDING MACHINES

(75) Inventors: Thomas Hartmann, Bückeburg (DE); Dirk Winkelhake, Nienstädt (DE)

(73) Assignee: Hey International GmbH, Obernkirchen (DE)

( * ) Notice: Subject to any disclaimer, the term of this patent is extended or adjusted under 35 U.S.C. 154(b) by 0 days.

(21) Appl. No.: 10/481,047

(22) PCT Filed: Jul. 26, 2002

(86) PCT No.: PCT/EP02/08313

§ 371 (c)(1),
(2), (4) Date: Dec. 16, 2003

(87) PCT Pub. No.: WO03/016229

PCT Pub. Date: Feb. 27, 2003

(65) Prior Publication Data

US 2004/0193304 A1    Sep. 30, 2004

(30) Foreign Application Priority Data

Aug. 16, 2001 (DE) ................................ 101 40 271

(51) Int. Cl.
*G06F 19/00* (2006.01)

(52) U.S. Cl. ........................................ 700/157; 65/160

(58) Field of Classification Search ........ 700/157–158; 65/158, 160, 161–164, 243–248

See application file for complete search history.

(56) References Cited

U.S. PATENT DOCUMENTS

| | | | | |
|---|---|---|---|---|
| 4,685,947 A | | 8/1987 | Liska et al. ..................... 65/29 |
| 5,475,601 A | * | 12/1995 | Hwang ........................ 700/157 |
| 5,609,659 A | * | 3/1997 | Peterson et al. ........... 65/29.11 |
| 5,652,490 A | * | 7/1997 | Bradshaw et al. .......... 318/615 |
| 5,812,392 A | * | 9/1998 | Dutto et al. .................. 700/22 |
| 2002/0052669 A1 | * | 5/2002 | Nittardi et al. ............. 700/157 |

FOREIGN PATENT DOCUMENTS

| | | |
|---|---|---|
| EP | 0 603 011 B1 | 6/1994 |
| EP | 0 683 141 A1 | 11/1995 |
| EP | 1 122 218 A2 | 8/2001 |
| EP | 1 184 754 A2 | 3/2002 |

* cited by examiner

*Primary Examiner*—Zoila Cabrera
(74) *Attorney, Agent, or Firm*—Synnestvedt & Lechner LLP

(57) ABSTRACT

Sections (22) of an I.S. glass forming machine (23) have a plurality of mechanisms which can be respectively driven by a first drive. Each first drive is allocated a controller which is connected to a first sequencer (60) via a first bus (59). All first sequencers (60) are connected to a second bus (70) to which a second sequencer (71), a manually-operated device (72), a PC (73) with an Internet connection (74) and a modem (75) are connected. Peripheral devices of the I.S. glass forming machine (23) each have at least one third drive (5, 7, 9, 11, 15, 21, 32, 41, 42, 43, 50, 51, 52, 17, 82). Each third drive is connected to a first control device (77). In the case of the third drives (17, 82) associated first control devices (77) are directly connected to the second bus (70), whereas in the other cases a plurality of first control devices (77) are connected to a third bus (78) which is connected to the second bus (70) via a second control device (79).

18 Claims, 3 Drawing Sheets

ELECTRONIC CONTROL FOR GLASS MOULDING MACHINES

BACKGROUND

The invention relates to an electronic control for a glass forming machine.

In the case of a known control of this type (EP 0 603 011 B1) all controllers of the glass forming machine are connected to a common synchronization signal line and are also connected to each other by a stop line which is directed to one side, by a LAN (Local Area Network), by a bi-directional maintenance stop line and by a parallel-distribution transition signal line. One of the controllers has the additional task of controlling all other controllers. The cost is high and effectiveness is limited.

From U.S. Pat. No. 4,685,947 A it is known per se to control the controllers of the mechanisms of each section of the glass forming machine by means of a section controller. All section controllers are monitored by a common monitoring controller. An additional machine controller is connected to all controllers and to the monitoring controller. The constructional and wiring expense is also considerable in this case.

According to the earlier application publication no. EP 1 184 754 A2, a complete I.S. glass forming machine and peripheral devices, such as the gob feeder which is connected upstream and devices connected downstream at the so-called "hot end", are controlled by a common control system. Two exemplified embodiments are disclosed in relation to this. In FIG. 2 the control system has a single central control unit which is connected via a serial CANbus (field bus) to a plurality of intelligent peripheral units. Each peripheral unit is also connected to a pneumatic or electric drive or to a sensor, and controls these drives or receives information from the electric drives or the sensors for local processing. This control system architecture is expensive. Faults in, or the failure of the central control unit lead to the whole production installation being disrupted or shut down.

In the other exemplified embodiment in accordance with FIG. 3 of the earlier EP 1 184 754 A2 the control system has three central units which are connected in a mutually parallel manner and are each connected to a common main CANbus. Each central unit is also connected by its own subordinate CANbus to a group of intelligent peripheral units. The first group controls all electric motors of the whole I.S. glass forming machine, the second group controls pneumatic molding movements of the whole I.S. glass forming machine and the third group serves to monitor the production installation equipment. This architecture is even more expensive. Faults in, or failure of a central unit lead to the whole I.S. glass forming machine being disrupted. The peripheral units cannot communicate with each other directly (for example for the purpose of mutual synchronisation).

From EP 1 122 218 A2 it is known per se to connect checking devices at the hot end behind an I.S. glass forming machine to the hub of a star network via a respective bi-directional line. The hardware ensures that the CAN elements connected to the hub have a serial structure in electrical terms.

It is the object of the invention of the invention to simplify the control of the glass forming machine and to make it more flexible.

SUMMARY OF THE INVENTION

This object is achieved by the present invention which provides a control for at least one glass forming machine. Here, each of the glass forming machines has an electronic control and a plurality of mechanisms and includes a first drive having a programmable movement profile and which drives one of the mechanisms; another first drive having a programable movement profile and which drives a second one of the mechanisms, the second mechanism opening and closing at pre-programable positions a first valve; a second drive with a non-programmable movement profile which can be activated and shut down by a second valve at programmable times, wherein the second drive drives a third one of the mechanisms; and a third valve which can be opened and closed at programmable times. A plurality of first controllers is provided, each of such first controllers are connected to at least one of the first drives, the second valve or the third valve. Also included is control means for controlling all of the first controllers, the control means having a first sequencer formed as a microprocessor, and all of the first controllers are connected to the first sequencer via a first bus. Practically all functions of the at least one glass forming machine are thereby controllable in a networked manner. By means of the bus system the known master-slave-system is consciously discarded and a message-orientated system is created. In this way very rapid input of messages and also rapid access to these messages from anywhere are made possible.

Advantageous embodiments of the invention are characterized in the subordinate claims.

BRIEF DESCRIPTION OF THE DRAWINGS

These and further advantages and features of the invention are explained in more detail hereinunder with the aid of the exemplified embodiments illustrated in the drawings in which:

FIG. 1 shows a schematic illustration of a gob feeder and gob distributor of a glass forming machine, FIG. 2 shows a schematic illustration of the so-called "hot end" of a glass forming machine, FIG. 3 shows a schematic circuit diagram for controlling a glass forming machine, and FIG. 4 shows a schematic circuit diagram for controlling an I.S. (Individual Section) glass forming machine and its peripheral devices according to FIGS. 1 and 2.

DETAILED DESCRIPTION

In FIG. 1 a feeder head 1 contains molten glass which exits as a glass extrusion through an outlet orifice 2. The manner in which it exits is influenced in a manner which is known per se by a rotating cylinder 3 and/or a plunger 4. The rotating cylinder 3 can be raised and lowered in the directions of a double arrow 6 by means of a third drive 5, indicated only schematically, and can be rotated around a vertical axis by means of a further third drive 7.

Figure 2:
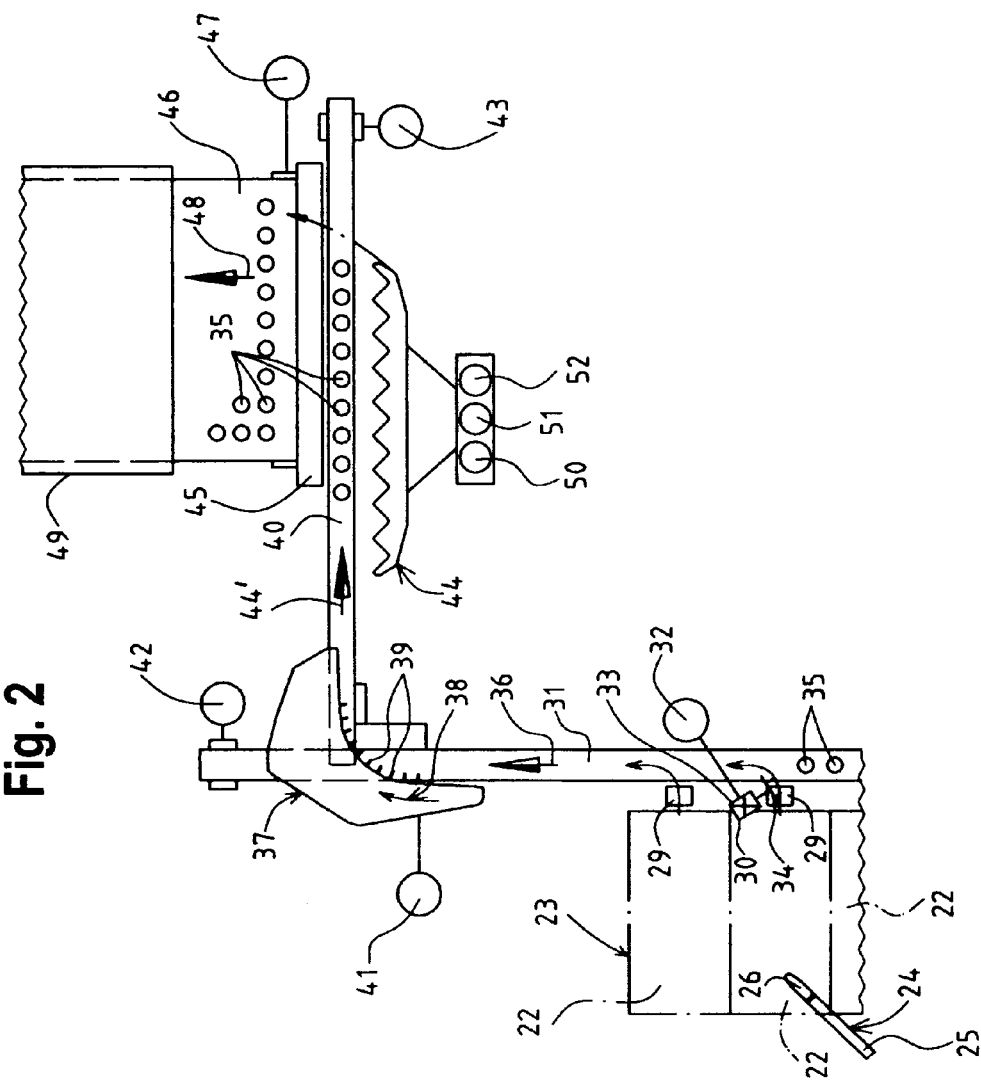

The plunger 4 is disposed inside the rotating cylinder 3 and held by a carrier device 8. The carrier device 8 can be adjusted in the horizontal direction in the directions of the double arrow 10 by a third drive 9 and can be raised and lowered in the directions of a double arrow 12 by a further third drive 11.

Gobs 14 of molten glass are periodically separated, by means of gob shears 13, from the glass extrusion leaving the outlet orifice 2. The gob shears 13 are driven by a third drive 15. Normally the gobs 14 fall freely past a gob deflector 16. When the gobs 14 are of poor quality or cannot be further processed for the moment, the gob deflector 16 is pivoted upwards by a third drive 17 about a horizontal axis 18 fixed to the machine. The gob deflector 16 then deflects the gobs 14 into a cullet channel 19 which sends the gobs 14 safely to a cullet bin, not illustrated.

When the gob deflector 16 is inactive the gobs 14 fall onto a downwardly-inclined scoop 20 which can be driven back and forth in a pivoting manner about a vertical axis by means of a third drive 21. The scoop 20 typically supplies a plurality of individual glass forming machines one after the other, for example, sections 22 (FIG. 2) of an I.S. (Individual Section) glass forming 23. For each section 22 a stationary channel system 24 is provided downstream of the scoop 20 and has a downwardly inclined trough 25 and a deflector 26 attached thereto. The deflector 26 catches the gob 14 from the trough 25 and deflects it vertically downwards so that it can fall into a mold recess 27 of a parison mold 28, indicated only schematically, of the section 22.

In accordance with FIG. 2 the sections 22 of the I.S. glass forming machine 23 are disposed next to each other in a manner known per se. For purposes of simplification only one channel system 24 is shown in the drawing. A plurality of channel systems 24 can also be provided per section 22. In this case the I.S. glass forming machine 23 would be operated in the so-called multiple gob operation in which a plurality of hollow glass objects per operating cycle are produced at the same time by one section 22.

For this production method each section 22 has, in a manner known per se, a plurality of mutually cooperating mechanisms. Such sections 22 preferably work by the press-and-blow process or by the blow-and-blow process. For a typical production program of the press-and-blow process and the mechanisms used therein, reference is made to DE 32 32 733 C1 of the Applicant.

A typical production program using the blow-and-blow method is to be found in U.S. Pat. No. 3,905,793 A, FIG. 1.

Thus the mechanisms of the sections 22 used both in the press-and-blow process and blow-and-blow process can also be regarded as being already fundamentally known. These mechanisms operate substantially one after the other, but their working processes can also overlap. All mechanisms are moved by drives, the advantageous control of which is a request of the present invention.

The finished hollow glass objects are finally removed by a take-out device, not shown in FIG. 2, from an opened blow mold and are set down on a dead plate 29. A pusher 30 is allocated to each dead plate 29 and pushes the finished hollow glass objects from the dead plate 29 through an arc of about 110° onto a conveyor belt 31 common to all sections 22. This pivoting movement about a vertical axis is achieved by a third drive 32. A component of the pusher 30 is a cylinder 33 which extends or retracts a finger carrier 34 for the hollow glass objects 35 in the horizontal direction. For the general function of such pushers 30, reference is made to EP 1 026 127 A2 of the Applicant.

The conveyor belt 31 transports the hollow glass objects 35, normally in a series, in the direction of an arrow 36 as far as a ware transfer mechanism 37 which turns in a horizontal plane in the direction of an arrow 38 and engages the hollow glass objects 35 by means of fingers 39 and deflects them onto a transverse belt 40 extending transversely to the conveyor belt 31. One example of such a ware transfer mechanism 37 can be found in U.S. Pat. No. 5,501,316 A of the Applicant. The ware transfer mechanism 37 is driven by a third drive 41. The conveyor belt 31 is driven by a third drive 42 and the transverse belt 40 is driven by a third drive 43 in the direction of an arrow 44'.

The hollow glass objects 35 are pushed by a stacker 44 in successive groups, in a manner which is known per se, in an arc from the transverse belt 40 via an intermediate plate 45 onto a lehr conveyor belt 46. The lehr conveyor belt 46 is driven by a third drive 47 in the direction of an arrow 48 and transports the hollow glass objects 35 through a lehr 49.

The stacker 44 is moved in a manner known per se by three third drives 50 to 52, which are only schematically indicated in FIG. 2, in three axes which are at right angles to each other. Details of this are to be found, for example, in DE 40 22 110 C2 of the Applicant.

Figure 3:
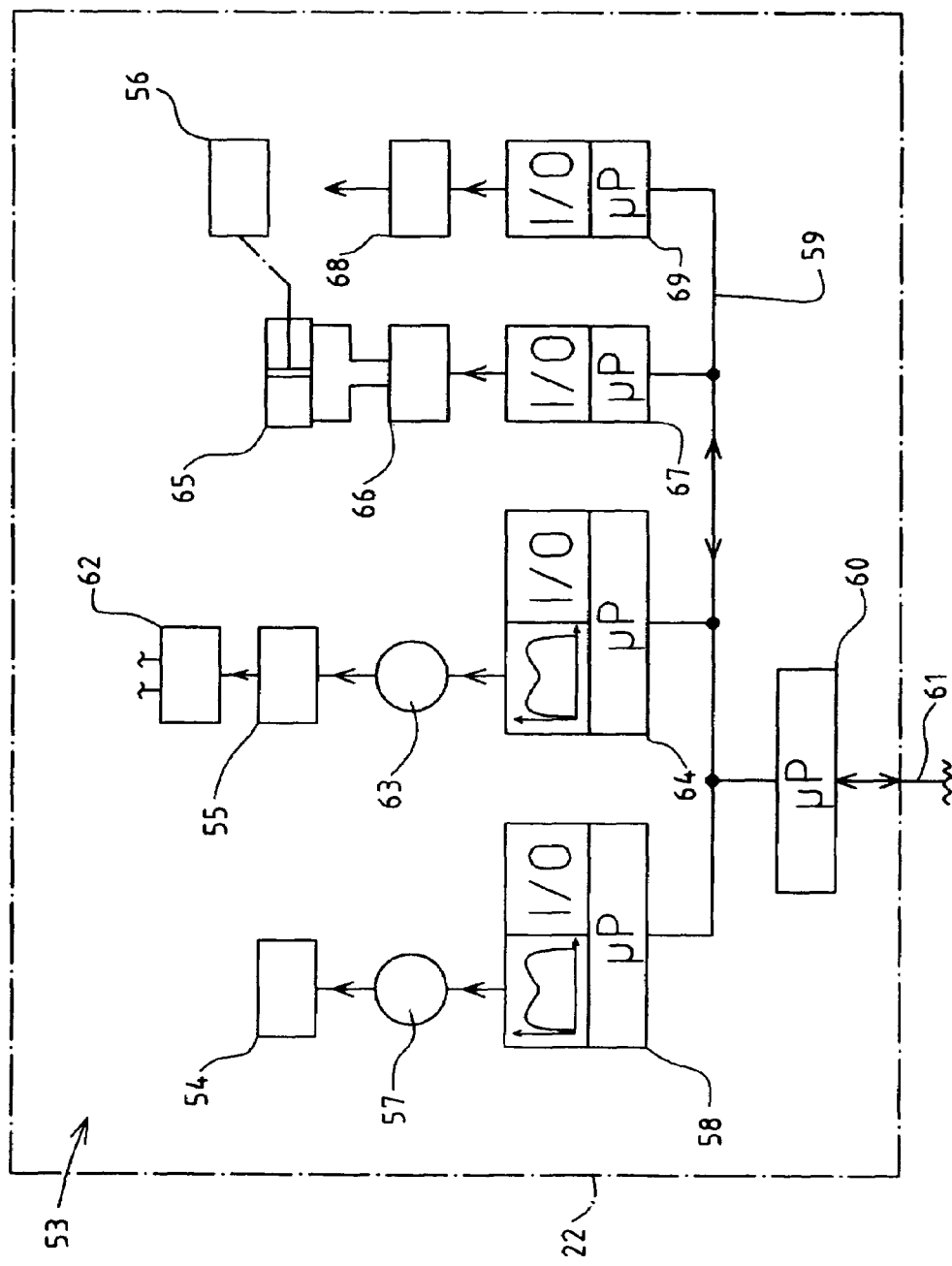

FIG. 3 schematically illustrates a circuit diagram for a part of an electronic control 53 of one section 22. In FIG. 3 the mechanisms 54 to 56 schematically represent the plurality of mechanisms of the section 22. The mechanism 54 can be, for example, a mold opening and mold closing mechanism. It is driven by a first drive 57 with a programmable movement profile. The first drive 57 is connected to a first controller 58 which is connected to a first bus 59. The first bus 59 is connected to a connection line 61 by means of a first sequencer 60.

The mechanism 55 can be, for example, an invert/revert mechanism. A first valve 62, for example, for cooling air supply, can be switched on and off in dependence upon the operating status of the mechanism 55. The mechanism 55 is driven by a first drive 63 with a programmable movement profile. The first drive 63 is connected to the first bus 59 by means of a first controller 64. The first drives 57, 63 are preferably formed as electric servo motors, for example, brushless three-phase current synchronous servo motors.

The mechanism 56 can be, for example, a pressing plunger used in the press-and-blow process or a plunger used in the blow-and-blow process. The mechanism 56 is driven by a second drive 65 formed as a piston-cylinder-unit. The second drive 65 is controlled by a second valve 66 which is connected to the first bus 59 by means of a first controller 67.

In FIG. 3 a third valve 68 is illustrated which, for example, controls the supply of cooling air to the mold parts. The third valve 68 is connected to the first bus 59 by a first controller 69. Each first controller 58, 64, 67, 69 has a microprocessor which in the case of the first controllers 58, 64 controls a respective converter for the first drives 57, 63. As illustrated in FIG. 3, each of the first controllers 58, 64, 67, and 69 is connected to the first sequencer 60 and to one another via the first bus 59. Furthermore, as indicated by the arrows shown on the first bus 59, the first bus 59 provides bidirectional communication between the items connected thereto.

Figure 4:
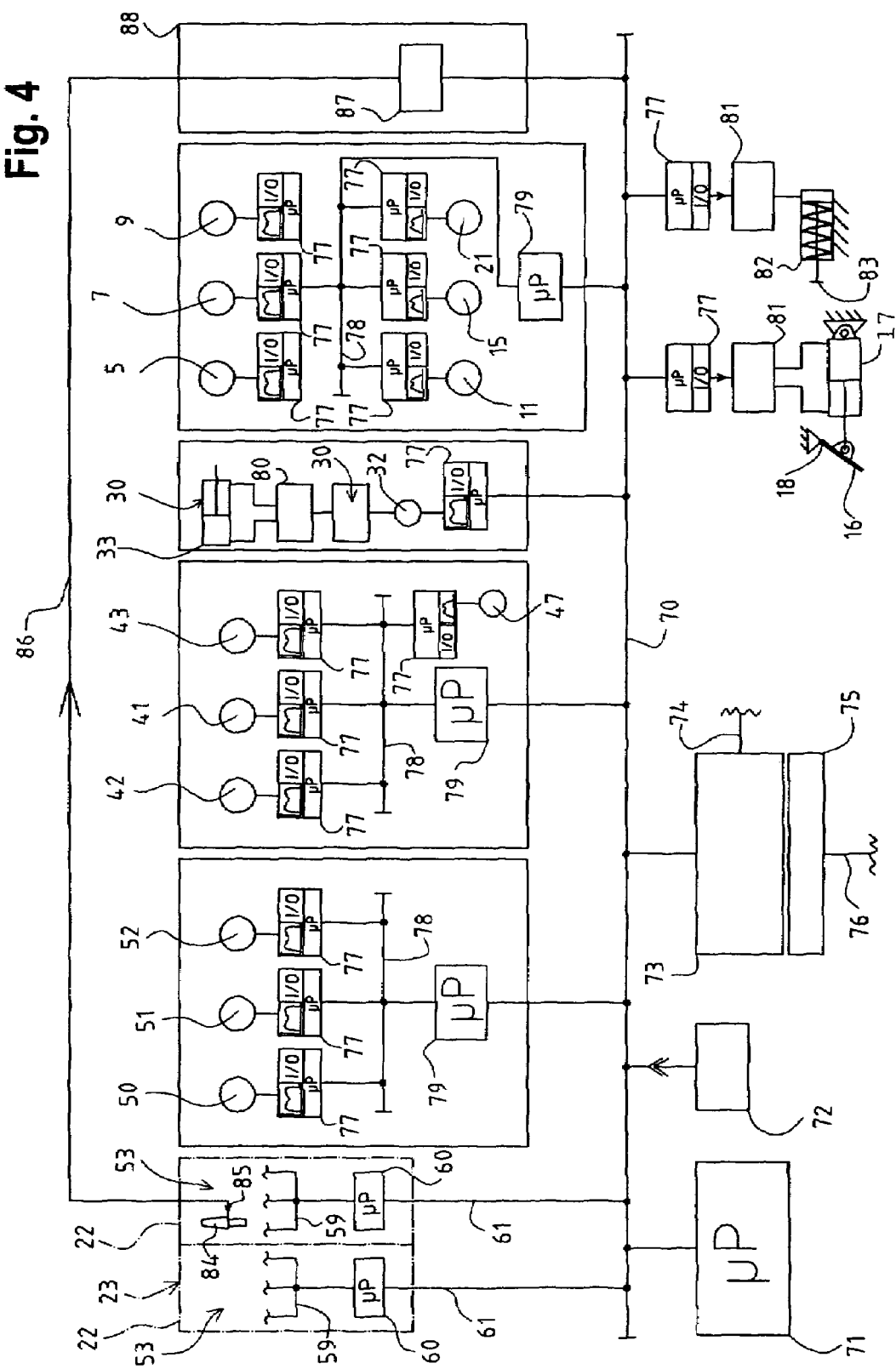

In the circuit diagram in accordance with FIG. 4 two sections 22 of the I.S. glass forming machine 23 corresponding to FIG. 3 are indicated on the left. The connecting lines 61 of the electronic controls 53 of these sections 22 are connected to a second bus 70 and form components of the second bus 70. Apart from the two sections 22 shown in FIG. 4 all other sections of the I.S. glass forming machine 23 are clearly also connected in this way to the second bus 70 with their electronic controls 53.

Furthermore, a second sequencer 71, a manually-operated device 72 and a PC 73 are connected to the second bus 70. The PC 73 can be connected to an external network, for example, the Internet, via a line 74. The PC 73 can also be connected to a telecommunications network 76 via a modem 75.

In accordance with FIG. 4 the third drives 50 to 52 of the stacker 44 (FIG. 2) are respectively connected to a third bus 78 via a second controller 77, which bus for its part is connected to the second bus 70 via a third sequencer 79.

In the same way the third drives 5, 7, 9, 11, 15, 21, 41, 42, 43 and 47 are connected to the second bus 70.

The third drive 32 of each pusher 30 is also connected, in accordance with FIG. 4, to the second bus 70 via a second controller 77. In dependence upon the pivot position of the cylinder 33 about the vertical axis a fourth valve 80 which controls the cylinder 33 is switched. For the sake of simplification only one pusher 30 is schematically illustrated in FIG. 4, although it is known that each section 22 has a pusher 30 of this type.

Figure 1:
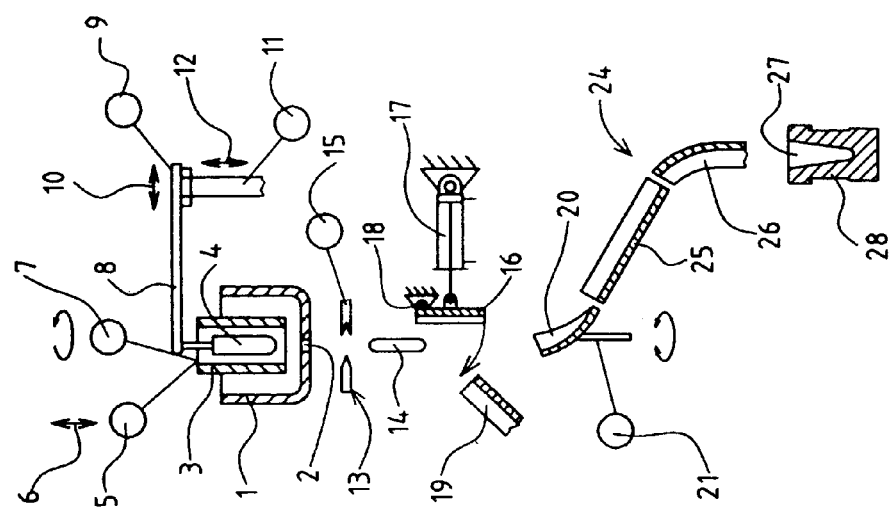

Furthermore, a fifth valve 81 is connected to the second bus 70 via a second controller 77 and controls the third drive 17 of the gob deflector 16 (see also FIG. 1).

A further second controller 77 is connected to the second bus 70 at the bottom right in FIG. 4 and controls a fifth valve 81 for a third drive 82, formed as a cylinder, of an ejector 83 for defective hollow glass objects 35 (FIG. 2).

Indicated schematically in the right-hand section 22 in FIG. 4 is a pressing plunger 84 to which a sensor 85 is allocated. As an example for a sensor 85 of this type reference is made to U.S. Pat. No. 5,644,227 A of the Applicant. In each operating cycle of the section 22 the sensor 85 produces a signal corresponding to the maximum penetration depth of the pressing plunger 84 into the associated parison mold 28 (FIG. 1). This signal in FIG. 4 is supplied via a separate signal line 86 to a control 87 of a process control device 88. The respective signal thus represents the respective penetration depth of the pressing plunger 84 into the parison mold 28 and is therefore a measure for the glass mass of the gob 14. Upper and lower desired values for the penetration depth of the pressing plunger and therefore the glass mass of the gob 14 are transmitted to the control 87 from a data memory of the PC 73 via the second bus 70 for the respectively produced hollow glass object 35 (FIG. 2). As soon as the actual pressing plunger position moves out of the desired range, then, on the one hand, this information is passed from the control 87 to the ejector 83 via the second bus 70 in order to remove corresponding faulty hollow glass objects 35, and, on the other hand, control signals are likewise sent via the second bus 70 to the second controller 77 of the third drive 11 in order to adapt the stroke 12 (FIG. 1) of the plunger 4.

An electronic general control is therefore created both for the individual sections 22 of the I.S. glass forming machine 23 and also for its peripheral devices. This general control advantageously uses busses. These busses can be busses which are message-orientated and have multi-master capabilities, for example they can be CANbusses. All control commands between the controllers, including safety-orientated commands, can be transmitted via the bus system provided, for example, the CANSafety or another protocol authorised by the BIA is used. A protocol of this type can also be used only between a subset of the controllers, for example the controllers for the gob deflector 16 and the scoop 20.

All drives are suited for production individually even without the PC 73 and the manually operated device 72, however, parameters can then not be adjusted. Parameters can only be changed by the PC 73. The addresses of the individual drives are configured via DIP switches or by software. All desired parameters can also be changed by the manually operated device 72, which can in particular be contacted on the conveyor belt 31 (FIG. 2) or can be wirelessly transferred. In the PC 73 the messages are centrally managed, and access is possible as desired to each section 22 and from there to a specific drive. In the PC 73 all parameters are centrally managed and archived. No real-time capability is required of the PC 73. The PC serves as an address converter between the manually operated device 72 and the individual drives.

The PC 73 is also the basis for visualizing the installation. The software of the PC 73 is programmed, for example, with the CBuilder or a similar tool, and the data are stored in a general database structure. All servo drives can then be parameterized via the second bus 70. However, all other drives can also be connected to this visualising PC 73 via the bus system.

It is advantageous that only one visualizing PC 73 is required for all components. All parameters which are used in the components are managed in a central database in the PC 73. Double inputting is thus no longer needed.

All hardware components can carry out their core task, while the real-time part of the application can no longer by disrupted by the visualizing part. In this way substantially more stable operation is achieved by more simple means. The amount of work required to set up the input and display masks is considerably reduced. All parameters of all components can be easily adjusted using the manually operated device 72 from each point of the installation since the manually operated device 72 is connected to the PC 73 and all components via the bus system and thus has access to all data. In this way the on-site operating stations can be limited to the bare essentials, which provides further cost savings.

Since the PC 73 does not have to carry out any real-time tasks whatsoever, a standard operating system (for example, Windows® NT) can be used. All standard software tools are then automatically available without special software tools having to be developed. All components which are connected to the PC 73 can be remotely maintained using the operating system. Either the line 74 of the PC 73 or the modem 75 with the connected telecommunications network can be used for this purpose. Remote diagnosis is also possible via these channels.

What is claimed is:

1. A control for at least one glass forming machine, wherein each said glass forming machine has an electronic control and a plurality of mechanisms and comprises:
   a first drive having a programmable movement profile and which drives one of the mechanisms;
   another first drive having a programmable movement profile and which drives a second one of said mechanisms, said second mechanism opening and closing at pre-programmable positions a first valve;
   a second drive with a non-programmable movement profile, which can be activated and shut down by a second valve at programmable times, wherein said second drive drives a third one of said mechanisms;
   a third valve which can be opened and closed at programmable times;
   a plurality of first controllers, each of said first controllers being connected to at least any one of the following: said first drives, said second valve and said third valve;
   control means for controlling all of said first controllers, said control means having a first sequencer formed as a microprocessor, and all said first controllers are connected to the first sequencer and to one another via a bidirectional first bus; and
   a plurality of said glass forming machines, wherein each of said glass forming machines is controlled by a respective said electronic control having a said first sequencer; a second bus to which each of said first sequencers are connected; and a second sequencer connected to the second bus.

2. A control as claimed in claim 1, wherein each of said first controllers has a microprocessor.

3. A control as claimed in claim 1, wherein each of said first drives has an electric servo motor and a converter, and each said converter can be controlled by a microprocessor of the associated first controller.

4. A control as claimed in claim 1 wherein
each said glass forming machine is formed as a section of an I.S. (Individual Section) glass forming machine,
all said first sequencers are connected to a second bus which is common to all said sections, and
a second sequencer, for controlling the entire I.S. glass forming machine, is connected to said second bus.

5. A control as claimed in claim 4, wherein a manually-operated device is connectable to said second bus at at least one point.

6. A control as claimed in claim 4 further comprising a PC, for visualizing and storing all control parameters, connected to said second bus.

7. A control as claimed in claim 6, wherein said PC has an Internet access.

8. A control as claimed in claim 6, wherein said PC can be connected via a modem to a telecommunications network for the purposes of remote diagnosis and remote maintenance.

9. A control as claimed in claim 1 wherein said glass forming machine cooperates with at least two peripheral devices which include at least one of the following: a rotating cylinder which can be rotated and raised and lowered, a plunger in a feeder head which can be horizontally adjusted and can be raised and lowered, gob shears, a gob deflector, a gob distributor, a pusher, a conveyor belt, a ware transfer mechanism, a transverse belt, a stacker, a lehr conveyor belt, a process control device controlling the gob mass, and an ejector;
wherein each of said peripheral devices has at least one third drive; and
wherein each said third drive is connected to an associated second controller having a microprocessor.

10. A control as claimed in claim 9, wherein a plurality of second controllers are connected to a third bus, and a third sequencer is connected on the one hand to the second bus and on the other hand to said third bus.

11. A control as claimed in claim 9, wherein said second controller is connected to the second bus and controls another valve which actuates the associated third drive.

12. A control as claimed in claim 1 wherein each said bus is formed as a CANbus.

13. A control as claimed in claim 1 wherein each of said buses is formed as a CANbus.

14. A control for multiple glass forming machines, comprising:
each of said glass forming machines having an electronic control and a plurality of mechanisms and further comprises,
a first drive having a programmable movement profile and which drives one of the mechanisms;
another first drive having a programmable movement profile and which drives a second one of said mechanisms, said second mechanism opening and closing at pre-programmable positions a first valve;
a second drive with a non-programmable movement profile, which can be activated and shut down by a second valve at programmable times, wherein said second drive drives a third one of said mechanisms;
a third valve which can be opened and closed at programmable times;
a plurality of first controllers, each of said first controllers being connected to at least any one of the following: said first drives, said second valve and said third valve;
control means for controlling all of said first controllers, said control means having a first sequencer formed as a microprocessor, and all said first controllers are connected to the first sequencer and to one another via a bidirectional first bus;
a second bus and a second sequencer connected to said second bus, and wherein said first sequencers of said multiple glass forming machines are connected to said second bus; and
wherein each of said glass forming machines is formed as a section of an I.S. (Individual Section) glass forming machine.

15. A control as claimed in claim 14 wherein
said first sequencers of said glass forming machines are connected to a second bus which is common to all said sections, and
a second sequencer, for controlling the entire I.S. glass forming machine, is connected to the second bus.

16. A control as claimed in claim 14 wherein each of said glass forming machines cooperates with at least two peripheral devices which include at least one of the following: a rotating cylinder which can be rotated and raised and lowered, a plunger in a feeder head which can be horizontally adjusted and can be raised and lowered, gob shears, a gob deflector, a gob distributor, a pusher, a conveyor belt, a ware transfer mechanism, a transverse belt, a stacker, a lehr conveyor belt, a process control device controlling the gob mass, and an ejector;
wherein each of said peripheral devices has at least one third drive; and
wherein each said third drive is connected to an associated second controller having a microprocessor.

17. A control for at least one glass forming machine, wherein each said glass forming machine has an electronic control and a plurality of mechanisms and comprises:
a first drive having a programmable movement profile and which drives one of the mechanisms;
another first drive having a programmable movement profile and which drives a second one of said mechanisms, said second mechanism opening and closing at pre-programmable positions a first valve;
a second drive with a non-programmable movement profile, which can be activated and shut down by a second valve at programmable times, wherein said second drive drives a third one of said mechanisms;
a third valve which can be opened and closed at programmable times;
a plurality of first controllers, each of said first controllers being connected to at least any one of the following: said first drives, said second valve and said third valve; and
control means for controlling all of said first controllers, said control means having a first sequencer formed as a microprocessor, and all said first controllers are connected to the first sequencer and to one another via a bidirectional first bus, said first bus being capable of providing bidirectional communication between said first controllers, and between said first controllers and said first sequencer;

wherein said first sequencer is connected to a second bus which is connected to an electronic control of another glass forming machine; and a second sequencer is connected to said second bus.

18. A control as claimed in claim 17 comprising a plurality of said glass forming machines, wherein each of said glass forming machines is controlled by a respective said electronic control having a said first sequencer.

* * * * *

UNITED STATES PATENT AND TRADEMARK OFFICE
CERTIFICATE OF CORRECTION

| | | |
|---|---|---|
| PATENT NO. | : 7,054,710 B2 | Page 1 of 1 |
| APPLICATION NO. | : 10/481047 | |
| DATED | : May 30, 2006 | |
| INVENTOR(S) | : Hartmann et al. | |

It is certified that error appears in the above-identified patent and that said Letters Patent is hereby corrected as shown below:

On the Title Page, paragraph entitled (73) should read as follows:

--(73) Assignee: Heye International GmbH, Obernkirchen, Germany--

Signed and Sealed this

Fifth Day of December, 2006

JON W. DUDAS
*Director of the United States Patent and Trademark Office*